US008662212B2

(12) United States Patent
Lawson, Jr.

(10) Patent No.: US 8,662,212 B2
(45) Date of Patent: Mar. 4, 2014

(54) FOUR WHEEL DRIVE SYSTEM

(76) Inventor: Thomas Towles Lawson, Jr., Charlottesville, VA (US)

( * ) Notice: Subject to any disclaimer, the term of this patent is extended or adjusted under 35 U.S.C. 154(b) by 943 days.

(21) Appl. No.: 12/794,369

(22) Filed: Jun. 4, 2010

(65) Prior Publication Data
US 2010/0307843 A1 Dec. 9, 2010

Related U.S. Application Data

(60) Provisional application No. 61/184,133, filed on Jun. 4, 2009.

(51) Int. Cl.
*B62D 11/04* (2006.01)
(52) U.S. Cl.
CPC ........................................ *B62D 11/04* (2013.01)
USPC ........................................................ 180/6.48
(58) Field of Classification Search
CPC ........................................................ B62D 11/04
USPC ......... 180/6.3, 6.48, 233, 234, 242, 248, 252, 180/307
See application file for complete search history.

(56) References Cited

U.S. PATENT DOCUMENTS

| 3,139,037 | A | * | 6/1964 | Budzich | ........................... 91/483 |
| 3,972,379 | A | | 8/1976 | Norris | |
| 4,434,680 | A | | 3/1984 | Riediger et al. | |
| 4,776,236 | A | | 10/1988 | Gleasman | |
| 5,857,532 | A | | 1/1999 | Satzler | |
| 6,761,234 | B1 | | 7/2004 | Lamela et al. | |
| 7,237,629 | B1 | | 7/2007 | Bland et al. | |
| 7,357,214 | B2 | * | 4/2008 | Ho et al. | ........................ 180/307 |
| 7,597,160 | B2 | * | 10/2009 | Lawson, Jr. | .................. 180/6.48 |
| 2005/0070390 | A1 | | 3/2005 | Irikura et al. | |

OTHER PUBLICATIONS

Ingersoll Rand; Bobcat, The New K-Series, All-Wheel Steer Loader, A300; On-line specification materials; www.bobcat.com; pp. 1-6; printed Oct. 2006.
Kubota; GR Garden Tractors, GR2000/GR2100; On-line features literature; www.kubota.com; pp. 1-5; printed Oct. 2006.
Boomer Compact Tractors; SuperSteer FWD Axle; On-line features literature; www.newholland.com; p. 1; printed Oct. 2006.
Kubota; M Utility/Ag Tractors, M-110/M-120; On-line features literature; www.kubota.com; pp. 1-3; printed Oct. 2006.
Boomer TV145 Bidirectional Tractor; On-line features literature; www.newholland.com; p. 1; printed Oct. 2006.

* cited by examiner

*Primary Examiner* — J. Allen Shriver, II
*Assistant Examiner* — Felicia L Brittman
(74) *Attorney, Agent, or Firm* — Laubscher & Laubscher, P.C.

(57) ABSTRACT

A four wheel drive system for bilaterally symmetric vehicles has separate controlled drive speed and direction for each wheel. Each drive system is operable to independently drive each wheel. The rear wheels of the vehicle are steering wheels which are connected with the vehicle frame for independent rotation about a vertical axis. Steering and driving of the wheels is controlled by a controller. The combination of controlled steering for the rear wheels through many degrees about their vertical axes and individual power to all four wheels provides the vehicle with a zero turning radius for improved mobility as well as improved traction on unstable surfaces.

12 Claims, 4 Drawing Sheets

FOUR WHEEL DRIVE SYSTEM

This application claims the benefit of U.S. provisional application No. 61/184,133 filed Jun. 4, 2009.

BACKGROUND OF THE INVENTION

Designers of vehicles, particularly heavy equipment vehicles, tractors, and the like have always had to decide whether traction or maneuverability was the more important quality in a given machine. Tractors at one time were generally not considered for four wheel drive systems because it was believed that deliberate weight distribution and bilaterally independent brakes on the drive wheels would be sufficient for maximum tractive force and directional control. Moreover, there are difficulties in providing a driving force to the front steering wheels of such vehicles. If the steering wheels are given drive capability, it would be advantageous to make the steering wheels larger for greater traction. However, larger front steered wheels interfere with the framework of the vehicle, thereby limiting their usefulness. In addition, conventional differentials required to drive the steered wheels are complex and expensive.

Articulated machines overcome some of these difficulties and have the advantage of having a simple non-steered axle on the front, which can support relatively more weight which is advantageous for front mounted implements or when the machine is configured with a loader assembly. The turning radius of articulated machines is not necessarily better than that of more traditionally shaped four wheel drive tractors.

Generally, all-wheel steer machines where both the front and rear axles are steering axles have a tighter turning radius that similar articulated machines. Another advantage to an all-wheel steer machine is that as a straight machine, it has the same tipping load at full turn as it does when the wheels are pointed straight ahead. Articulated machines in contrast have a lower tipping point load when turned because the back half of the machine is both offset relative to the front wheels and closer to the load. These two factors make the machine less stable axially and works to the detriment of the rear half of the machine in its capacity as a counterweight to the load.

Maneuverability has always been an important characteristic of tractors and similar machines. Tracked earthmoving equipment was for many years the benchmark for turning radii. Crawlers had to steer with clutches and brakes which varied the speed of the tracks relative to one another. When one track was locked, the machine could turn on the spot. Two wheel drive tractors can achieve some of the same effects by locking the brake on the inside drive wheel while steering the steered wheels all the way in that direction. Using the brakes allows a tighter turn, and tractor steering radii are customarily rated with and without brakes. Scuffing occurs when the brakes are used because the steering geometry does not turn the steering wheels tight enough to coordinate with a locked drive wheel brake. Scuffing is worse if the tractor is configured to have four wheel drive for at least four reasons:

1. The front tires are larger diameter and have more aggressive tread than their two wheel drive counter parts in order to take advantage of the fact that they are driven. The consequence of this is that the wheels cannot turn as tightly without interfering with the vehicle frame so they have to slide more to achieve the same tight turn.
2. The enhanced traction of driven front wheels means that when they do slide, they tear up more ground because their enhanced traction resists slipping.
3. The braked rear wheel slides or the other drive wheel is likely to spin as they try to force the front wheels to rotate and this tears up the ground.
4. The problem is worse if four wheel drive is engaged because tractors typically do not have a center differential. Accordingly, the arcs of the front wheels are greater than those of the rear wheels. The front wheels effectively rotate too slowly, and the tighter the turn, the greater their speed difference and therefore the greater the scuffing.

Although for many years crawler tractors were the most maneuverable by virtue of their ability to pivot around one track, the advent of closed circuit hydrostatic systems allowed for an even tighter turn to be practical. Whereas pivoting around one braked track results in a very short radius turn, a spot turn where one track goes in reverse and the other goes forward is tighter. A compound differential provides a similar counterrotation of the tracks.

The concept of counter rotating drive mechanisms has been applied to wheeled machines, and highly maneuverable zero radius turn machines have found their way into timber and mowing machines and small front end loaders. These machines typically use hydrostatic drives which are modular to allow design flexibility. The utility of a zero turning radius vehicle's capacity for turning in a reverse direction within the length of the vehicle, is great enough that the short comings of the two main machine forms of this category have not prevented their widespread acceptance in various applications.

The two machine forms in the category of dual path hydrostatic drive machines are skid steers and machines which have two drive wheels on one axis which steer and propel the machine, and a caster wheel or wheels on the other end of the machine. Skid steers have roughly bilaterally symmetrical drive systems where the front and rear tires on each side are linked exemplarily by a chain. When the left drive transmission goes slower than the right, a left hand turn is effected. If the left wheels are held still and the right wheels are driven forward, a pivot turn to the left is made. This is analogous to the steering clutches and brakes which provide pivot turns of old style bulldozers. Sometimes, because the left and right transmissions are independent, the wheels on one side are driven backwards and the ones on the right are driven forward, which results in a spot turn. This type of four wheel drive vehicle has exceptional traction considering its wheel size, especially in a straight line. Increasing the wheel size is limited by the short wheel base necessary to reduce the horsepower required to make the skidded turn, the necessity of limiting the damage to the ground during the skid turn, and the cost of tires which wear very quickly on this type of machines. Steering induced hop is also a problem in skid steers.

Machines with dual path transmissions connected with wheels which drive and steer the machine at one end and casters on the other end do not have the same wheel diameter limitation of skid steers. Some of these machines are used in timber harvesting, where their maneuverability is an enormous asset as they drive among standing trees, and commercial lawn mowing where they have gained almost universal acceptance. On a larger scale, self propelled wind rowers are dedicated hay mowing machines. The drawback to dual path machines where the two drive wheels share the load of both steering and driving is that if one drive wheel loses traction either because of soft footing or hillside operation, all of the steering is lost. The fact that the other drive wheel may still have traction is of little or no value because it only pushes the machine in the proper direction by chance. The caster wheels provide neither tractive effort nor steering ability and are there only to support weight.

Much prior art now links the steering wheels to the drive wheels in this dual path type machine. Many of these patents seem aimed at operator ease, but surely directional control is improved and appreciated. There is a greater need for improved traction. Some such vehicles have steering wheels which pivot about vertical axes in place of directionally unstable caster wheels. There is a need for improved traction.

The present invention relates to zero turning radius vehicles in which the steering wheels are both driven and rotated about their vertical axes to control the steering and propulsion forces. The other two wheels roll according to the logic in an electronic controller in a coordinated manner relative to the steered wheels. The two non-steered wheels can at times during sharp turns rotate in opposite directions relative to each other, and one may go backwards when the vehicle goes forward, all as determined by the controller and all under power. It is an object of this invention to define the most efficient and cost effective design for the such a vehicle.

BRIEF DESCRIPTION OF THE PRIOR ART

Various devices have been used to decrease the turning radius of four wheel drive tractors. Kubota uses a bi-speed turning mechanism wherein variable speeds are used for the front axle relative to the rear. Kubota also manufactures a system where clutches are used in place of a differential between the rear wheels so that in tight turns, the system is practically a four wheel vehicle with the three outside wheels being driven. Others have used steerable axles where the entire axle pivots about its vertical axis.

Other methods of decreasing turning radii while maintaining four wheel drive include four wheel steering, skid steering such as provided by Bobcat, and articulated steering. Some machines have combinations of the above. Some of these devices include skid steers which can be switched by the operator to all wheel steering (Bobcat A300) (Case.; Lamela et al U.S. Pat. No. 6,761,234) or articulated machines which have one or more steerable axles (Deere 204J, 304J, 344J stereo steering). Stereo steering refers to an articulated machine which has a steerable rear axle. The advantages of this configuration are the strength of the rigid front axle but with less articulation, and the associated load reduction, for a given radius turn. However, other than skid steering, none of these devices allow a zero turn radius. Moreover two wheel drive zero turning radius vehicles known in the art are not provided with four wheel drive because of the complexities of driving the steering wheels as set forth above. The Lawson U.S. Pat. No. 7,597,160 discloses a four wheel drive vehicle which also has zero turning radius capabilities. An object of the present invention is to simplify the design and number of components required to accomplish the four wheel drive zero radius turn described in Lawson U.S. Pat. No. 7,597,160.

Another goal of this invention is to increase the efficiency of machines with drive elements which need to be able to counter rotate by reducing pumping losses in such machines.

A further object of this invention is to provide a straight machine whose tipping load is not compromised in a turn.

SUMMARY OF THE INVENTION

The four wheel drive system of the invention is suitable for use with bilaterally symmetrical vehicles having a pair of front wheels and a pair of rear wheels. Each of the rear wheels is connected with the vehicle for rotation about a vertical axis to provide steering for the vehicle. A drive system rotates the front wheels about horizontal axes and rotates the rear wheels about horizontal axes to propel the vehicle in forward and reverse directions. A steering drive system further rotates the rear wheels about their vertical axes to steer the vehicle. The rear wheels can be turned through 360 degrees to provide the vehicle with a zero turning radius. Normally, a rotation of fewer degrees than 360 will suffice.

A controller is connected with the first and second drive systems to control the operation thereof in order to propel and steer the vehicle in a desired direction. The controller is also preferably connected with each wheel to receive signals from the wheels corresponding to the horizontal rotation thereof and to the turning position of the rear wheels. The controller coordinates the steering angles of the steering wheels and the speeds and direction of each of the four wheels according to algorithms or tables and in response to signals from the operator interface. The speeds of the wheels relative to each other and the angles of the steering wheels will vary with the track and wheelbase of the vehicle. The tracks of each of the steered wheels is tangential to arcs, the radii of which extend from a single point on a line which is on the axis of the non-steered wheels. Sometimes, especially when the track of the front and rear wheels is the same, the point is between the non-steered wheels, where one of the steering wheels is turned more than 90 degrees relative to its straight ahead position. In some configurations they both are turned more than 90 degrees.

The drive systems comprise hydraulic pumps or motors. The second drive system includes two pumps, one for delivering a propulsion force to the rear wheels and another for delivering a steering force to the rear wheels.

In an alternate configuration, the first drive system for the front wheels includes a power source, a power splitter connected with the power source, and a pair of opposed drive mechanisms connected with the power splitter and the front wheels. Each drive mechanism includes a first differential clutch connected with the power splitter and a second differential clutch connected with the first differential clutch. First and second braking devices are connected between the first and second differential clutches to control the delivery of power from the power splitter to each wheel. Operation of the first and second braking devices controls the degree and direction of driving power being delivered from the power source to the wheels. In a preferred embodiment, hydraulic pumps act as the braking devices and appropriate valves and controls avoid the need for separate pumps.

In another configuration the aim of which is to reduce the number of pumps and their associated cost, complexity of integration and inefficiencies, a single pump is fluidly connected to drive motors associated with each of the four wheels. A steering angle sensor or sensors detects the angle of each of the steering wheels and sensors detect speed and rotation of each wheel. The controller can change the angles of the drive motor swash plates to vary the speed, direction and torque of the motors for a given flow from the pump. In this configuration, one pump drives all of the motors in parallel. This pump can be either of two types.

The first is an open circuit pump, which always sends flow to all of the motors and then to the reservoir, This method may have a cost advantage but has at least two disadvantages. The first disadvantage of an open circuit system is that all of the wheels need to be able to be reversed by going to an over-center condition under the control of the controller while relying on fluid flow which always goes in the same direction. The other disadvantage is that open circuit systems are less efficient than closed circuit hydrostatic systems.

As used herein, the term loop, which can be open or closed, refers to feedback which is typically electric to an electronic controller in the context of control theory. A circuit, be it open or closed, refers to hydraulic flows relative to the reservoir. A closed circuit is synonymous with hydrostatic, and the loop is from the pump to the motor and back to the pump. An open circuit is reservoir to pump to actuator to reservoir. Hydrostatic systems allow control of the pump directly, with no valving.

A distinction is made between open and closed circuits. Open circuit means that the fluid goes from a pump to the motor to the reservoir and closed circuit means that the fluid goes from a pump to motor or motors and back to the pump, with the reservoir only receiving the volume lost to the case drains of the pumps and motors because they leak as part of their functions of cooling and lubrication. A second pump known as a charge pump replaces the fluid lost to the case drains or reliefs. Closed circuit and hydrostatic are properly synonymous, because the pressure is basically static. When the pressure is high on one side i.e the line between the pump "a" port and motor "a" port while accelerating forward the pressure is low on the "b" ports, and in reverse the first side is low and the pump and motor ports "b" are high. A second pump known as a charge pump replaces the fluid lost to the case drains or reliefs.

Another distinction which needs to be made is between open and closed loop systems. Because circuit and loop have such similar definitions in the vernacular and are even used interchangeably in the art, this clarification is necessary. An open loop system is one where by design the controller does not receive feedback from the wheel and cannot determine whether a target speed is achieved. Closed loop means that a sensor of some type sends a signal which allows the controller to calculate whether a signal it sends causes the intended effect. An example of this from the current invention is that if it were made with four closed circuit hydrostatic pump and motor systems, one for each drive wheel, the controller would not need feed back from the wheels and could still be within a plus or minus 10% range on wheel speed because of the pump motor efficiencies. For at least one of the following preferred embodiments, closed loops are probably necessary because the controller has only one pump to control four wheels. The closed loops allow the controller to effectively control wheel speed independently of each other by changing the motor displacements. Traction and other variables like grade and steering angle require feedback on wheel speed to know whether fluid is going to the right place.

A preferred method of using one pump to power all wheels is to have a closed loop system where all of the variable displacement wheel motors are connected to the single pump in a closed circuit. The closed circuit pump controls forward and reverse operation of the vehicle by changing direction of fluid flow as is well known in the art, but in this embodiment the two front wheels, which sometimes rotate in opposite directions, have variable displacement motors which are under the control of the controller. One way to have wheels rotate in opposite directions while connected in parallel to the same flow would be by valving, which is inefficient, Overcenter axial piston pumps and motors have a swash plate which can be controlled between its full number of degrees in either direction of zero displacement. The four wheel drive system described herein would benefit from a closed circuit, closed loop hydrostatic system. This system includes one pump capable of delivering bidirectional fluid flow so that the vehicle can be driven in forward reverse direction, and four motors, two of which are of the overcenter type. The two overcenter motors can rotate in opposite directions of each other whether the pump is driving the steering wheels forward or reverse. The two steering wheels are not of the overcenter type. They can be used for braking when the pump is de-stroked. The default position of all four motors swash plates is the same, full stroke position.

In yet another embodiment, the drive of the two non-steered wheels is done by either a single motor connected to a pump capable of bidirectional flow, or an open circuit pump and an overcenter motor which drive a compound differential as is know in the art. Another way of driving the compound differential is by an electric motor or some other more traditional transmission. Regardless of the specific drive, devices are known in the art for driving opposed drive mechanisms in opposite directions. See for example the U.S. patents to Gleaseman U.S. Pat. No. 4,776,236, Riediger U.S. Pat. No. 4,434,680 and Satzler U.S. Pat. No. 5,857,532.

The term differential steering when used to distinguish tracked tractors from those with steering brakes and clutches denotes a compound differential. The compound differential has planetary gear sets with multiple inputs. One input is the drive input and the second input is the steering input. The steering input commonly is driven by a bidirectional hydraulic motor. When the drive input is driven by the engine and transmission and the steering motor is stopped the two out put shafts drive the two drive mechanisms be they wheels or a track at the same speed. If as the vehicle moves along with the hydraulic motor spinning one way, one drive mechanism slows down and the other speeds up. When the hydraulic steering motor spins the other way, the opposite happens. This is how a tracked machine would turn left or right. Counter-rotation of the tracks is achieved when the hydraulic steering motor spins fast, or if it spins at all when the drive input is stopped.

BRIEF DESCRIPTION OF THE FIGURES

Other objects and advantages of the invention will become apparent from a study of the following specification when viewed in the light of the accompanying drawing, in which.

DETAILED DESCRIPTION

Figure 1:
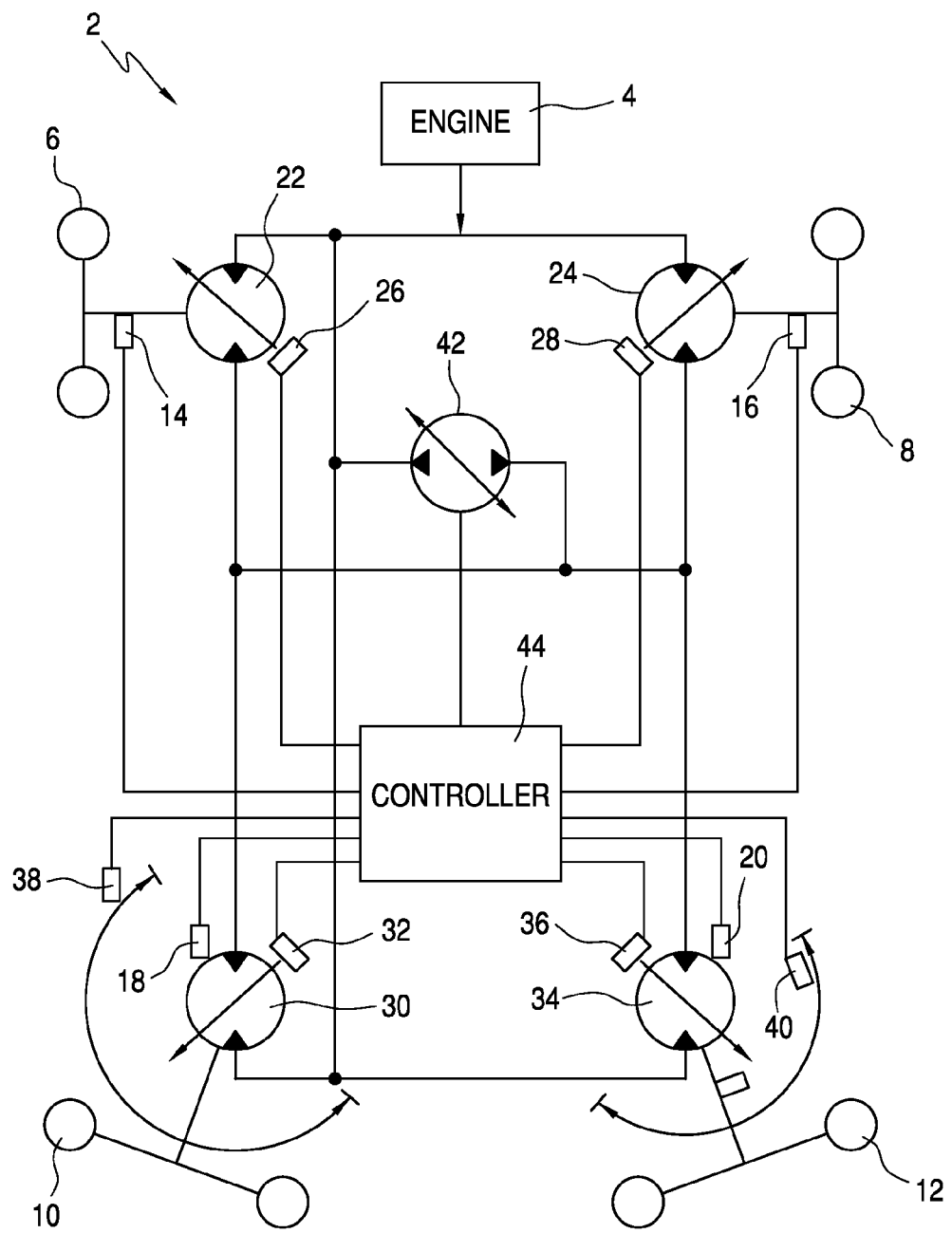
FIG. 1 is a schematic diagram of the four wheel drive system according to the invention.

Referring to FIG. 1, the four wheel drive system according to the invention will be described. The vehicle 2 includes an engine 4 which provides power to propel the vehicle and for the various components of the vehicle drive system. In addition, the vehicle includes non-steerable left 6 and right 8 front wheels and left 10 and right 12 steerable rear wheels. Although wheels are shown, it will be apparent to those of ordinary skill in the art that the wheels can be replaced with tracks or other rotatable devices. Wheel speed sensors 14, 16, 18, and 20 are provided for each of the wheels 6, 8, 10, and 12, respectively.

The drive system includes a variable displacement overcenter motor 22 for the left non-steer wheel 6 and another variable displacement overcenter motor 24 for the right non-steer wheel 8. A servo controller 26 is provided for the left overcenter motor 22 and a servo controller 28 is provided for the right overcenter motor 24.

The drive system further includes similar drive systems for the steerable wheels 10, 12. More particularly, a variable displacement overcenter motor 30 is connected with the left steerable wheel 10 and includes a servo controller 32. A variable displacement overcenter motor 34 is connected with the right steerable wheel 12 and includes a servo controller 36. A steering angle sensor 38 is provided for the left steerable wheel 10 and a steering angle sensor 40 is provided for the right steerable wheel 12 as will be developed below. The overcenter motors 22, 24, 30, and 34 are connected with a pump 42 which provides pressurized fluid used to power the motors. While variable displacement overcenter motors are shown for the rear wheels in FIG. 1, conventional motors which are not variable may be used in place of the overcenter motors.

The servo controllers 26, 28, 32, and 36, the wheel speed sensors 14, 16, 18, and 20 and the pump 42 are connected with a controller 44. The steering angle sensors 38 and 40 provide signals to the controller corresponding with the angle or orientation of the steerable wheels, respectively. The wheel speed sensors 14, 16 generate signals delivered to the controller as a function of the speeds of the left and right non-steered wheels 6, 8, respectively. The controller 44 calculates the desired wheel speeds for movement of the wheels 6, 8 as directed by the operator. Based on the controller's calculations of desired wheel speeds for movement, a non-steerable wheel's motor 22, 24 may go overcenter in order to spin the associated wheel in the opposite direction from the other non-steered wheel motor. Overcenter in this sense refers to a condition where the swash plate of the motor pivots to an overcenter condition to reverse the motor without reversing the fluid flow thereto. In a forward left hand turn which pivots about the front left non-steered wheel 22, the pump 38 will be stroked so that fluid flow makes the two steering wheels 10, 12 roll forward. The overcenter motor 24 on the right front is at its default setting which is full stroke consistent with the steering wheel motors 30, 34. The angle of the swash plate of 24 means that it will drive the front right wheel forward as well. The swash plate of the left front wheel overcenter motor 22, however, is moved in the opposite direction enough so that the left front wheel stays stationary. In a well-coordinated properly functioning machine on level ground, the swash plate of the left front overcenter motor 22 will practically be at zero. If the operator commands an even tighter left turn, the controller 40 will signal the overcenter motor 22 to stroke further in the direction, which is opposite of the default setting, and so the motor 22 causes the front left wheel to roll in reverse even though the fluid flow causes the other three wheels to go forward.

Figure 2:
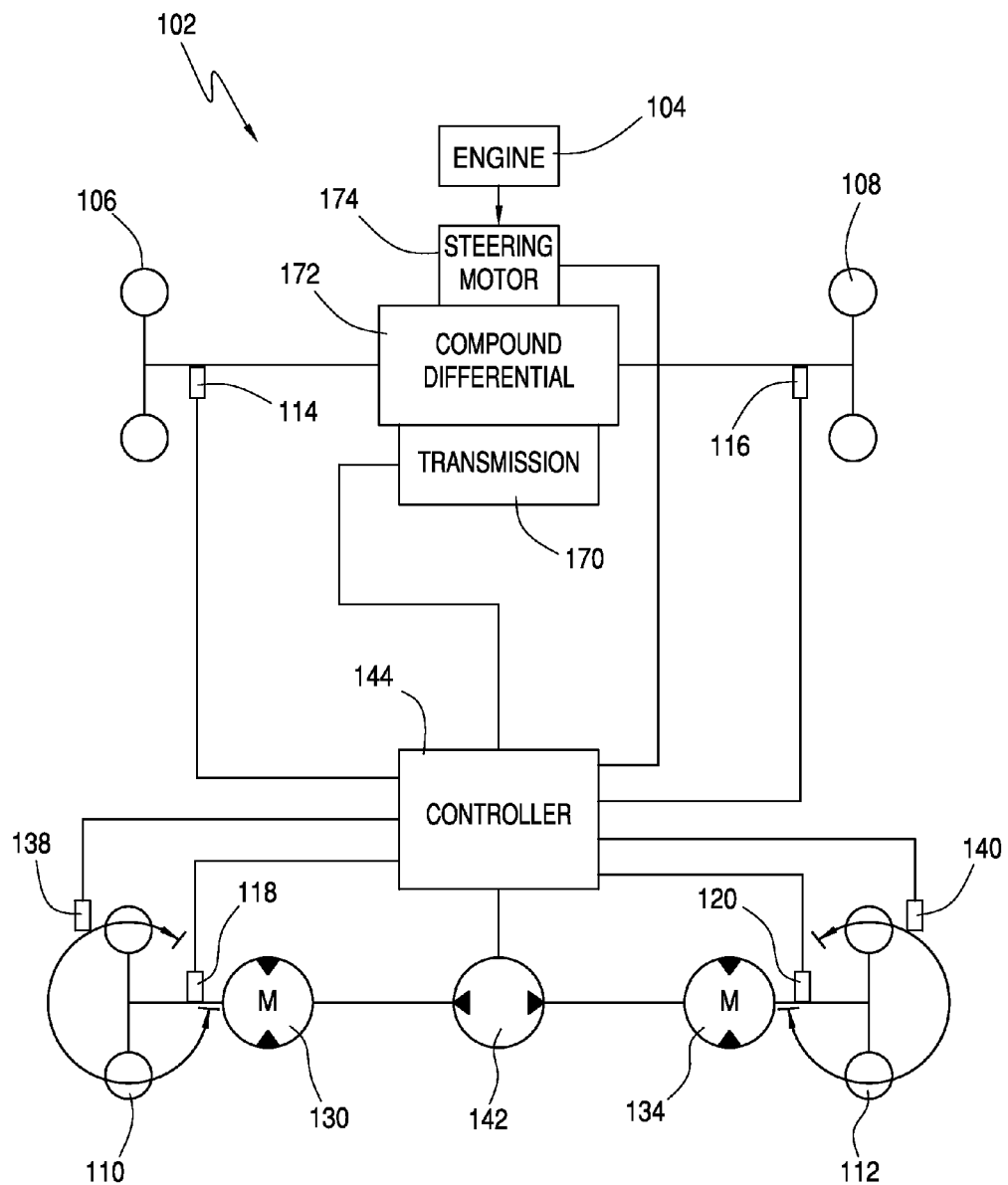
FIG. 2 is a schematic diagram of a transmission with overcenter steering wheel motors

Referring now to FIG. 2, an alternate embodiment of the invention will be described. In this embodiment, the drive system for the front non-steerable wheels 106, 108 includes a transmission system in place of variable displacement overcenter motors.

As in the embodiment of FIG. 1, the drive system of FIG. 1 includes an engine 104 and wheel speed sensors 114 and 116 for the front non-steerable wheels 106 and 108, respectively. The left steerable wheel 110 includes a wheel speed sensor 118, a steering angle sensor 138, and a motor 130. The right steerable wheel 112 includes a wheel speed sensor 120, a steering angle sensor 140, and a motor 134. The motors 130 and 134 are driven off of a pump 142. A controller 144 is connected with the wheel speed sensors 114, 116, 118, and 120 and with the steering angle sensors 138 and 140 and the pump 142 in the same manner as in the embodiment of FIG. 1. The drive system of FIG. 2 includes a traditional transmission 170 which is connected with the controller 160. The transmission is of the mechanical, hydromechanical, or electric hydraulic pneumatic type. The transmission drives a compound differential 172 connected between the non-steerable wheels 106 and 108. A steering motor 174 is connected with the controller 144 and the compound differential 172. The overcenter motors 130 and 134 are under control of the controller 144 to destroke if wheelspin is detected and to coordinate with the front wheel speed. The controller varies the speed of the wheels by controlling engine speed, transmission ratio, pump displacement and motor displacement.

It will be obvious to those skilled in the art that the counter rotation of the front wheels in FIG. 1 can be considered as a system by itself including one pump and two motors. Referring to the embodiment of FIG. 3, such as system will now be described. The system includes a wheel speed sensor 214 for a left wheel (not shown), a left variable overcenter motor 222 and a servo controller 226 therefor to drive the left wheel. The system further includes a wheel speed sensor 216 for a right wheel (not shown), a right variable overcenter motor 224 and a servo controller 228 therefor to drive the right wheel. The motors are connected with a pump 242 and the wheel speed sensors and servo controllers are connected with a controller 244, as is the pump.

Figure 3:
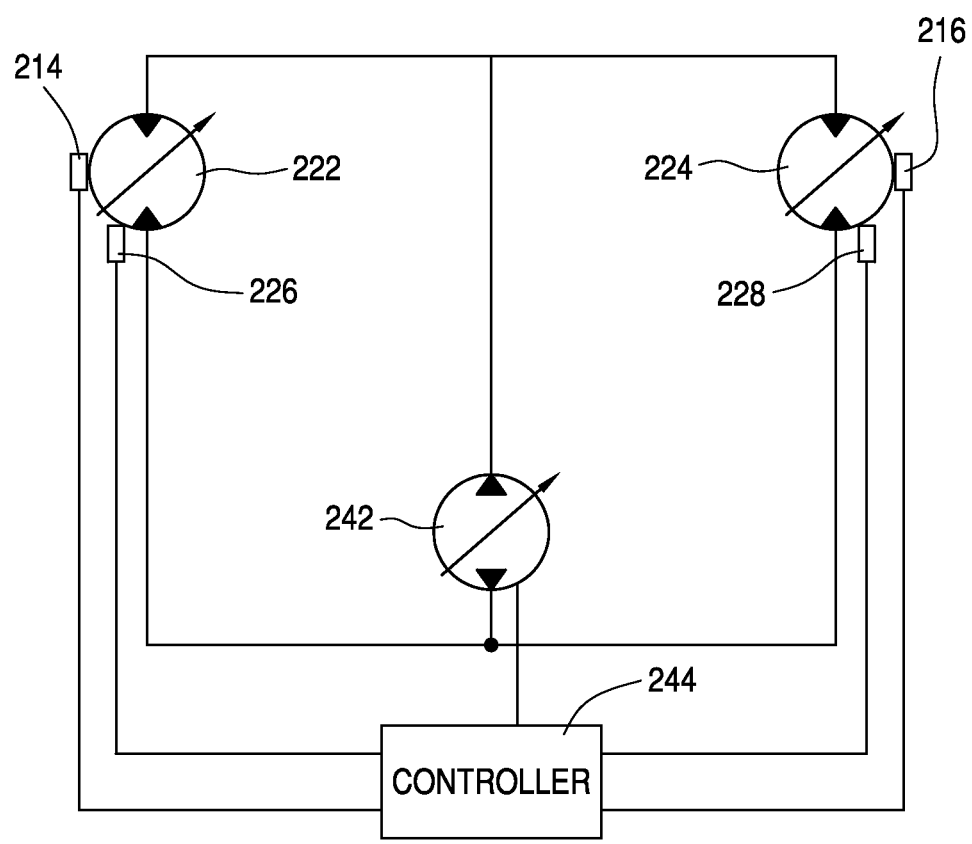
FIG. 3 is a schematic diagram of a stand alone preferred drive system for the front wheels of a vehicle or machine.

The system of FIG. 3 is useful for other machines such as tracked machines to increase efficiency by eliminating one of the pumps in a dual path system, or by eliminating the valving incorporated into most tracked excavators. A second advantage when used in a tracked excavator is that a closed loop hydrostatic system can be utilized while only sending one high pressure circuit through the slew ring from the engine to the undercarriage and tracks of the vehicle. Both overcenter motors have a default full stroke position. This position is maintained by a spring or similar device so that in a power failure, the overcenter motors will default to the same swashplate angle as each other. In a situation where the motors are at their default setting, they provide powerful dynamic braking in most situations. The system allows the vehicle to move in a circle in place which is similar to the relationship of two driven wheels on a traditional differential rotating in opposite directions if the brake for the wheels is on the input element of the differential. A parking brake can be provided for the sake of a possible emergency situation which is good practice for any hydrostatic machine and standard procedure since dynamic braking is not provided if hoses break. Therefore the provision of a secondary braking system is not onerous relative to dual path systems.

The wheel speed sensors 214 and 216 of the system of FIG. 3 provide feedback to the controller 244 which can actively reduce the swash plate angle of the pump 242 when a turn is initiated. If the vehicle is traveling forward for example, and the pressure in the hydraulic system is anything other that at full pressure, reducing the stroke of the left track motor for example without reducing the stroke of the pump will have one of three effects. The desired effect of a turn to the left will occur if the motor is de-stroked quickly enough to a low enough angle that the torque is reduced sufficiently to cause the track to slow. A second effect is that the track may speed up since the motor now has a smaller displacement and the flow is the same. A turn to the right instead of left may occur in this situation. The right hand turn is actually more likely if the vehicle is a drive steer vehicle with caster wheels as described earlier for forestry and mowing machines. Tracks would provide more directional stability and the side with reduced torque would tend to not be the faster side. A third effect of reducing the stroke of the left motor is that the total volume of the drive motors is reduced and so they may both speed up. All of these factors must be taken into account by the controller and algorithms which are analogous to the electrical method of pulse width modulation may be used by the controller. Pulse width modulation may be used to control both the pumps and motors to achieve faster response of the solenoids which drive the swash plates. For a given solenoid, there is a maximum amount of current it can use and supplying this maximum amount of current will cause the solenoid to go to its maximum in order to set a certain rate. Allowing more than the maximum amount of current through the solenoid for a sustained period will cause it to overheat and fail.

Pulse width modulation sends a much higher current than the solenoid is rated for, but only for a brief period. The current is then lowered below the solenoid's maximum, or cut completely. The solenoid thus has a much more rapid response, but is not damaged. In response to analog signals sent to the wheel/track overcenter motors, when the operator commands a turn, the controller sends a signal to the motor to go to zero, or even reverse. The associated wheel/track speed sensor then sends a signal to the controller which commands whether the desired effect is being achieved. If so, then the motor starts to come back to the default position. If not, stroking of the swash plate of the overcenter motor continues toward the opposite side. The controller may need to control the pump, by reducing its swash plate angle to keep the vehicle from accelerating, or the operator may well become familiar with the machine quickly enough that this is unnecessary. The machine or vehicle must be designed in case the controller does not reduce the swash plate angle of the pump during a turn so that the maximum pump flow is not enough to damage either motor if the flow is directed only through one motor, as would be the case if the other motor were at zero angle.

Figure 4:
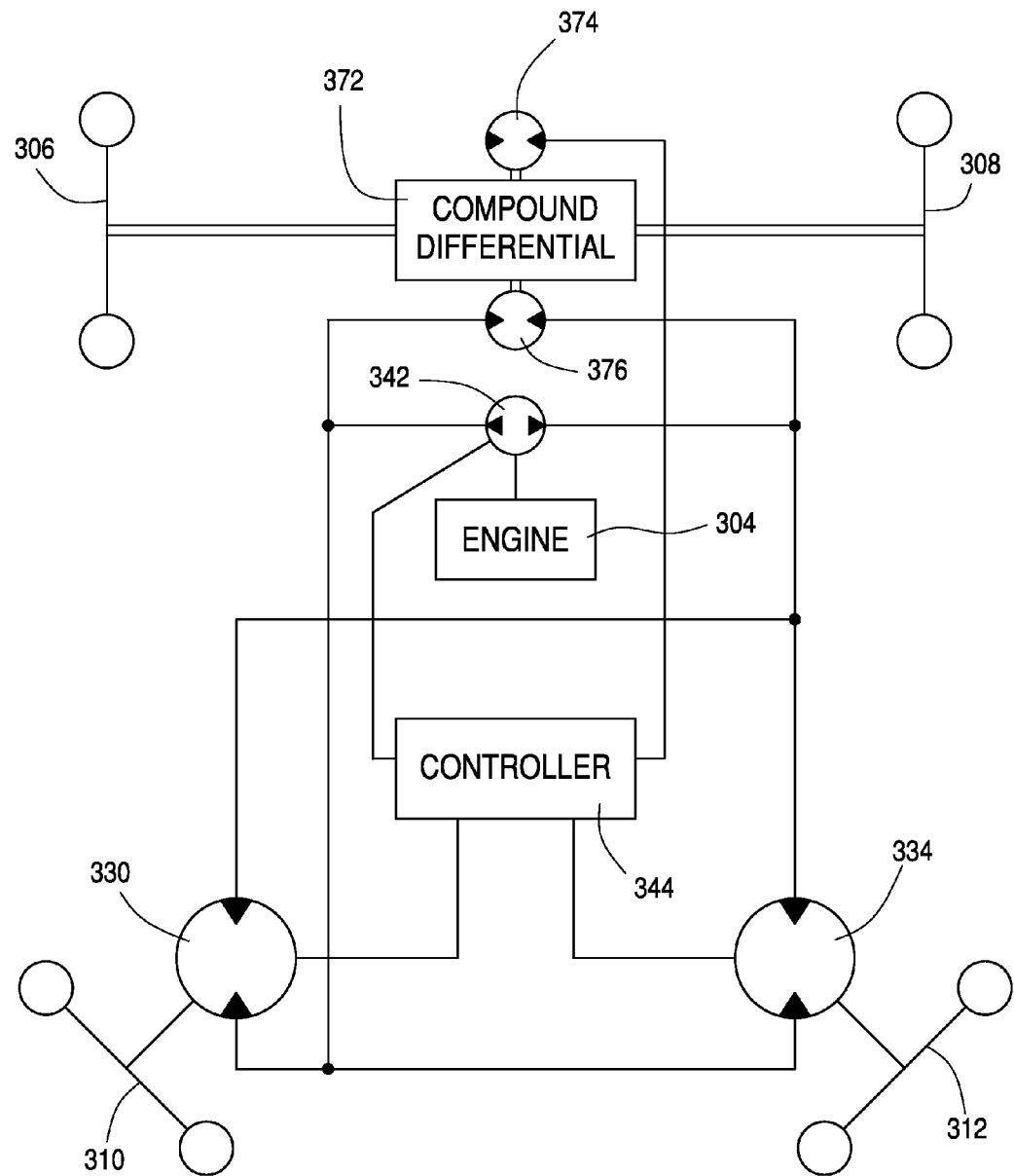
FIG. 4 is a schematic diagram of a preferred drive system incorporating three overcenter motors and a compound differential.

Another embodiment of the invention, which is a modification of the embodiment of FIG. 2, is shown in FIG. 4. This version includes the wheel speed sensors and steering angle sensors shown in FIG. 1, but they have not been illustrated for clarity. The vehicle 302 includes an engine 304, a left non-steerable front wheel 306, a right non-steerable front wheel 308, a left steerable rear wheel 310 and a right steerable rear wheel 312. The left steerable wheel is driven by a motor 330 and the right steerable wheel is driven by a motor 334. The motors are driven by a pump 342 which is controlled by a controller 344. In addition, the controller controls a steering motor 374. The drive system includes a compound differential 372 having two output elements, one for each front wheel 305, 308. The compound differential 372 also has a drive input element from a motor 376 and a steering input driven by steering motor 374. The steering motor has bidirectional ability attached to a second input of the compound differential.

The steering motor 374 is controlled by the controller 344 and may be of the overcenter type driven off a different pump, may be incorporated into a hydrostatic drive, may be controlled by valves, or may be electric.

Rotation of the steering motor in a first direction causes the left unsteered wheel 306 to slow, stop or reverse relative to the right unsteered wheel 308. Its rotation in a second direction causes the right wheel to slow, stop or reverse relative to the left wheel. The speed and direction of the wheels 306. 308 is also dependent on the first drive input of the compound differential 372. If the drive input is stopped and the steering input motor spins, then the wheels rotate in opposite directions at the same speed. In this example the transmission is a hydrostatic transmission. The engine 304 drives the pump 342 which delivers flow in either direction to a motor 376 which drives the compound differential, It is advantageous to include the steered wheel motors 330, 334 in the hydrostatic circuit. The steered wheel motors may have their own pump or pumps or be electric, but in this description they are under the control of the controller 344. The controller controls the steered wheel motors 330, 334 for steering reinforcement, coordination of wheel speeds, and slip control. They motors may be overcenter motors. They need not be overcenter motors if they are included in a closed loop circuit with an overcenter pump or pumps.

When the operator wants to move forward, the controller 344 signals the pump 342 to send fluid in the appropriate direction, and because all of the wheel motors are on the same circuit, they all spin their respective wheels forward. If the operator then commands a turn, the controller 344 sends signals to the steering wheel actuators (not shown) to turn. The controller also sends signals to the steering wheel motors 330, 334 to change their stroke if necessary. Typically the motor on the inside wheel would be de-stroked in order to decrease its torque, but the sensor (not shown) provides feedback to the controller so the controller can adjust the motor so that it attains the controller's target speed speed therefor. The drive motor for the front wheels spins them at the same speed for straight line travel and the steering motor 374 is stopped. In a turn, the steering motor spins at a rate determined by the controller to allow a coordinated turn with one front wheel speeding up as the other slows.

The speed of the steering motor relative to the speed of the drive motor and the steering wheels is specific to a given operator command as are the steering angles of the steered wheels. While the drive system has been described in connection with hydraulics, it is closely analogous to an electric system. The compound differential can be used with two drive motors instead of splitting the motors up and driving the left and right non-steered wheels directly. The advantages of linking two drive motors instead of having one large motor include reduced cost and the ability to take one of the motors out of the circuit for high speed low torque operation.

While the preferred forms and embodiments of the invention have been illustrated and described, it will be apparent to those of ordinary skill in the art that various changes and modifications may be made without deviating from the inventive concepts set forth above.

What is claimed is:

1. A four wheel drive system for a vehicle having an engine, a pair of front non-steered wheels and a pair of rear steerable wheels, comprising (a) drive means connected with said front wheels for rotating the wheels independently of each other to afford counter rotation, wherein said drive means comprises a pair of variable displacement overcenter motors connected with the front wheels, respectively, said variable displacement overcenter motors being connected with said pump;

(b) a pair of rear variable displacement motors connected with said rear steerable wheels, respectively, for driving and steering said steerable wheels;

(c) a pump for supplying fluid to said motors;

(d) a controller for controlling the operation of said drive means, said rear motors and said pump in accordance with input from an operator of the vehicle; and (e) servo controllers connected with said variable displacement overcenter motors and with said rear motors, said servo controllers controlling swash plates in said overcenter motors to an overcenter condition for counter rotation, said servo controllers being connected with said controller, whereby said front wheels may be driven simultaneously in opposite directions and said rear wheels may be driven at different speeds in the same direction to prevent wheel slippage and scuffing in unstable conditions and while executing a turn.

2. A four wheel drive system as defined in claim 1, and further comprising steering angle sensors connected with the rear steerable wheels and with said controller to provide signals corresponding with the angular position of the steerable wheels, respectively.

3. A four wheel drive system as defined in claim 2, and further comprising wheel speed sensors connected with said front and rear wheels and with said controller to provide signals corresponding with the rotational speed of the wheels, respectively.

4. A four wheel drive system as defined in claim 1, wherein said drive means comprises a compound differential connected with the front wheels.

5. A four wheel drive system as defined in claim 4, wherein said drive means further comprises a transmission connected with said compound differential and with said controller.

6. A four wheel drive system as defined in claim 5, wherein said drive means further comprises a steering motor connected with said compound differential and with said controller.

7. A four wheel drive system as defined in claim 5, and further comprising steering angle sensors connected with the rear steerable wheels and with said controller to provide signals corresponding with the angular position of the steerable wheels, respectively.

8. A four wheel drive system as defined in claim 6, and further comprising wheel speed sensors connected with said front and rear wheels and with said controller to provide signals corresponding with the rotational speed of the wheels, respectively.

9. A four wheel drive system as defined in claim 4, and further comprising a front motor connected with said compound differential and with said controller, said front motor further being connected with said pump.

10. A four wheel drive system as defined in claim 9, and further comprising a steering motor connected with said compound differential and with said controller.

11. A four wheel drive system as defined in claim 10, wherein said pump, said rear motors and said front motor are connected in a closed hydrostatic system wherein the direction of flow to the system can be varied and reversed with the pump.

12. A steering transmission for non-steered wheels of a vehicle, comprising
 (a) first and second variable displacement overcenter motors connected with the non-steered wheels, respectively, for independently rotating the wheels, said motors containing swash plates which are operable to an overcenter position;
 (b) a pump connected with said first and second variable displacement overcenter motors for supplying fluid thereto;
 (c) a controller connected with said pump and with said first and second overcenter motors for controlling the operation of said motor switch plates in accordance with input from an operator of the vehicle; and
 (d) wheel speed sensors and servo controllers connected with said first and second variable displacement overcenter motors and with said controller, whereby the front wheels may be driven simultaneously in opposite directions to execute a turn.

\* \* \* \* \*